F. A. LITTLEFIELD.
STEAM TRAP.
APPLICATION FILED OCT. 21, 1910.
1,141,249.
Patented June 1, 1915.
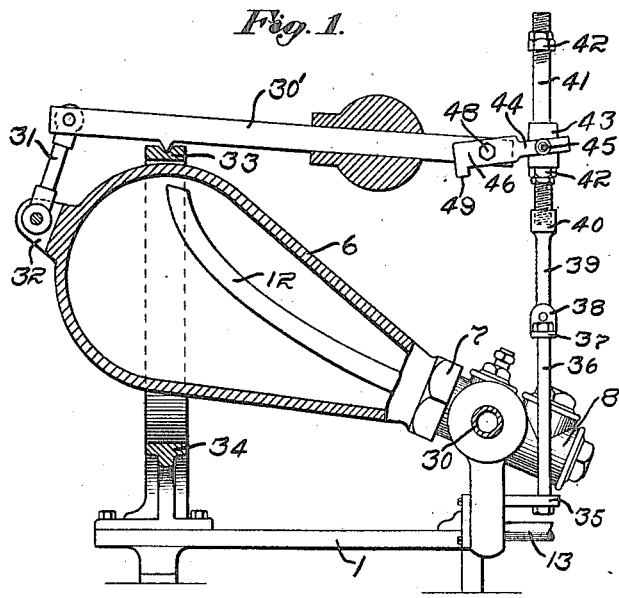
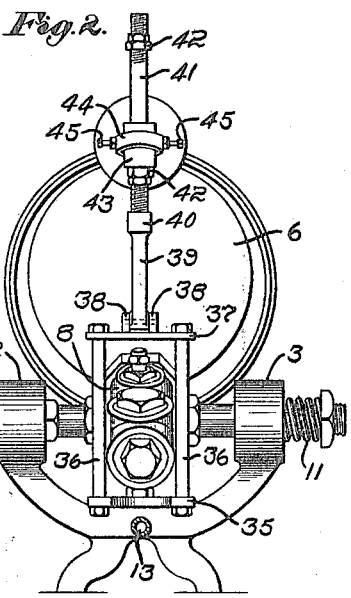
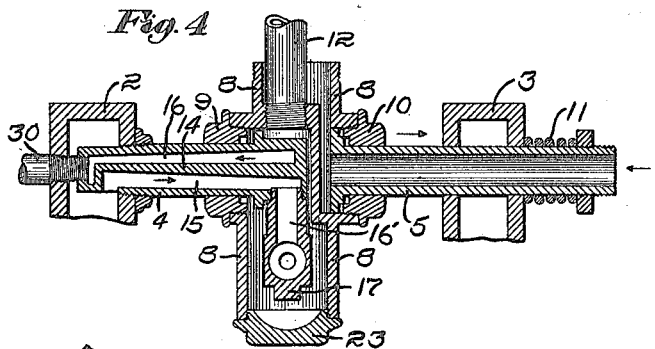
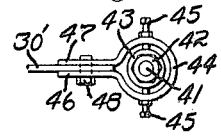
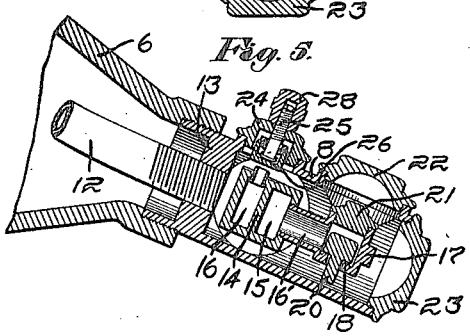
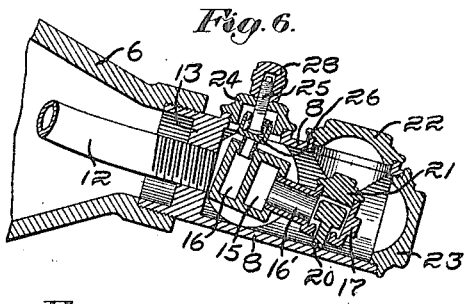
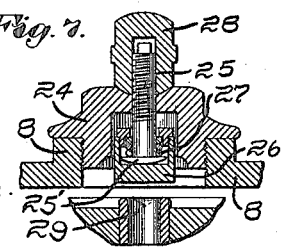
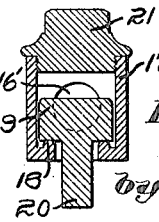
Witnesses:
Carl L. Choate.
Robert H. Kammler.
Inventor:
Frank A. Littlefield,
by Emery, Booth, Janney & Varney
Att'ys

UNITED STATES PATENT OFFICE.

FRANK A. LITTLEFIELD, OF NASHUA, NEW HAMPSHIRE, ASSIGNOR TO NASHUA MACHINE COMPANY, OF NASHUA, NEW HAMPSHIRE, A CORPORATION OF MAINE.

STEAM-TRAP.

1,141,249.   Specification of Letters Patent.   Patented June 1, 1915.

Original application filed December 2, 1909, Serial No. 531,034. Divided and this application filed October 21, 1910. Serial No. 588,232.

*To all whom it may concern:*

Be it known that I, FRANK A. LITTLEFIELD, a citizen of the United States, and a resident of Nashua, in the county of Hillsboro and State of New Hampshire, have invented an Improvement in Steam-Traps, of which the following description, in connection with the accompanying drawings, is a specification, like letters on the drawings representing like parts.

This invention relates to steam traps and more particularly to shock absorbers therefor, and is a division of my co-pending application, No. 531,034, filed December 2, 1909.

The trap herein shown is of that general type shown and described in my United States Letters Patent No. 893,529, dated July 14, 1908, and No. 994,851, dated June 13, 1911.

In order that the principle of the invention may readily be understood, I have disclosed a single embodiment thereof in the accompanying drawings, wherein—

Figure 1 is a view mainly in vertical central section of a steam trap and shock absorber therefor embodying my invention; Fig. 2 is a front end elevation thereof; Fig. 3 is a plan view of a portion of the shock absorber; Fig. 4 is a horizontal section taken through the bowl head, its trunnions and adjacent parts; Fig. 5 is a central vertical section taken through the bowl head and representing the position of the valves when the bowl is elevated; Fig. 6 is a corresponding view representing the position of the valves when the bowl is depressed. Fig. 7 is a sectional detail view on an enlarged scale of the vent valve; and Fig. 8 is a similar view of the live steam valve.

While the steam trap herein disclosed may in certain aspects thereof be of general application, it is more particularly intended for use as a return trap for steam boilers. I have herein shown and shall specifically describe one type to which my improved shock absorber is applicable, but it is to be understood that the shock absorber is applicable to various other types of traps, but particularly those which are tilting and provided with counterweighting means.

Referring more particularly to the drawings, the base or tripod whereon the various parts of the trap are supported is indicated at 1, it preferably having a tubular yoke generally similar to that shown in my Patent No. 491,486, Feb. 8, 1893, the ends of the yoke arms being represented at 2, 3 in Figs. 2 and 4. The said yoke arms 2 and 3 respectively support the trunnions 4, 5 serving in the character of stud shafts whereon the tilting bowl 6 is mounted. Into the neck 7 of the bowl is threaded the chambered head 8, as shown in Figs. 4, 5 and 6, said head having opposite packing nuts 9, 10 threaded into side openings therein. Said nuts constitute bearings for the bowl and permit it and its chambered head to rock upon the trunnions 4 and 5. The trunnion 5, and which I herein for convenience designate the feed and discharge trunnion, may be and preferably is similar to the corresponding part in my said application No. 476,069, it being preferably provided with a coiled spring 11 tending to move said trunnion axially to the right, viewing Fig. 4, thereby to establish a tight joint between said trunnion and the packing nut 10. The pipe constituting the trunnion 5 is suitably connected to the steam boiler and to the circulation, in order to receive the water of condensation and conduct it into the bowl through the head 8 thereof, as indicated by an arrow in Fig. 4. When the bowl is filled the water of condensation is returned through said pipe to the boiler as indicated by an arrow in said figure.

In that type of steam trap herein illustrated, the water of condensation flows by gravity from the bowl when the latter is depressed. In order to permit the water of condensation to escape from the bowl by gravity in the type of trap here illustrated, I introduce steam or other suitable fluid into the bowl above the surface of the water therein, so that the pressure upon the water may be equalized. For this purpose the bowl is provided with a pipe 12 threaded into a partition 13 near one end of the head 8. Steam or other suitable fluid is admitted from any suitable source into the pipe 13', shown in Fig. 1 as tapped into the yoke, and is then conducted through the hollow yoke arm 2 and thence into the trunnion 4.

I have for convenience herein designated the trunnion 4 as a live steam and vent trunnion. As shown most clearly in Fig. 4, this trunnion has its inner end which is positioned within the head 8 closed, and is divided by a longitudinal partition 14 into a live steam inlet passage 15 and a steam exhaust passage 16. The steam inlet passage 15 is at all times in communication with the interior of the yoke arm 2, as shown in Fig. 4, and thus is constantly supplied with steam.

As shown most clearly in Figs. 5 and 6, the trunnion 4 is provided with a threaded lateral opening at that end which is received within the head 8, and threaded thereinto is a short pipe 16' positioned wholly within the outer end of the head 8 of the bowl and having a closed end 17. Preferably, in the bottom of the pipe 16' I provide a valve seat 18 and mount thereon a live steam valve 19 having a stem 20 extending through the valve seat 18 to within a suitable distance from the adjacent portion of the interior wall of the head 8, when the bowl 6 is elevated or in its filling position. The valve stem 20 should for the best results be of such length as to provide for lost motion between the movements of the bowl and valve. Opposite the valve seat 18 the pipe 16' is preferably provided with a threaded plug 21 and in line with the head is provided with a suitable threaded plug 22 permitting access to the parts. Preferably also the head 8 is provided with an end threaded plug 23. While the bowl is filling, that is, while it is in its elevated position, the live steam valve 19 is seated, inasmuch as its stem 20 is out of contact with the wall of the head. When, however, the bowl is filled and descends in the frame, the head 8 thereof, being at the opposite side of the trunnions from said bowl is elevated into the position shown in Fig. 6. During the movement of the head into the position shown in Fig. 6, the wall thereof contacts with the stem 20 of the live steam valve 19, thereby lifting the valve as indicated in said figure and opening the same. This permits the steam contained within the inlet passage 15 and pipes 16' to escape past said valve into the annular space between the pipe 16' and the head 8 and thence through the pipe 12 into the bowl 6, thereby equalizing the pressure upon the water of condensation in the bowl. Preferably the stem 20 of the valve 19 is made short enough so that the bowl may have moved downward a sufficient distance to acquire considerable momentum before the wall of the bowl head 8 contacts with said stem and opens the valve. The result of this construction is that when the valve is opened it is opened quickly and the descent of the bowl is not interrupted.

It is apparent that after the bowl is emptied, it is necessary to reduce the steam pressure therein to permit refilling thereof, and for this purpose there is provided a vent valve, shown most clearly in Figs. 5, 6 and 7. As there shown, the head 8 has a plug 24 threaded therein and tapped into said plug is an adjustable valve stem 25 having a flange 25' provided with a preferably rounded lower face and a valve head 26 loosely mounted on said stem. Said valve head is preferably composed of two parts threaded together and between said valve head and the valve stem flange 25' is a coiled spring 27. The valve stem 25 is provided with a lock nut 28 permitting any desired adjustment of said valve stem. The valve head 26 is adapted to seat upon a preferably detachable valve seat 29 provided upon the steam exhaust side of the trunnion 4. Viewing Fig. 5, it will be noted that when the bowl 6 is in elevated or filling position the vent valve is opened, thereby permitting reduction of steam pressure within the bowl 6. The steam introduced into the bowl to equalize the pressure upon the water therein escapes through the pipe 12 and enters the steam exhaust passage 16 through the valve seat 29 and thence escapes through a suitable pipe 30 (Fig. 4) to any desired point. It will be evident that in the form of trap here illustrated the live steam valve 19 closes during and preferably at the commencement of the upward movement of the bowl 6, and when closed prevents admission of steam through the pipe 12 into the bowl. The vent valve does not begin to open until the live steam valve is entirely closed, the trap after the live steam valve is closed continuing its upward movement sufficiently to open the vent valve. The spring 27 and the loose mounting of the valve head 26 upon the valve stem 25 permit the retention of said vent valve upon its seat 29 during a portion of the upward movement of the bowl 6 and until the live steam valve is closed, the spring 27 being contracted by the upward movement of the bowl 6 and the consequent similar movement of the valve stem 25, which being upon the same side of the rocking axis of the bowl moves in the same direction as the bowl. After the live steam valve is entirely closed, the head 26 of the vent valve is snapped from the valve seat 29 and thus permits the escape of steam from within the bowl 6. During the reverse movement of the bowl, that is to say, when it is filled and is descending in the frame, the vent valve closes and substantially simultaneous with the opening of the live steam valve, thus preventing loss of live steam through the exhaust. The tilting of the bowl 6 is preferably governed by means of a weighted lever 30' connected by a link 31 with an ear 32 on the bowl 5. The operation of the trap is rendered desirably prompt and accurately responsive to the predetermined condition of water in the bowl 6 substantially in the manner described in my Patent No. 893,529, July 14, 1908. Other bowl tilting means may be employed.

In Figs. 1, 2 and 3, I have shown one type of shock absorber or cushioning device adapted for use with the return trap above described and also with tilting steam traps of other types and employed for other purposes. In the present disclosure of the invention the said shock absorber is more particularly adapted for use with and is operatively connected to the said weighted lever 30'. The outer or larger end of the tilting bowl 6 is received within a ring like frame 33 bolted to the base 1. When the bowl is in its elevated position shown in Fig. 1, it contacts with and its further upward movement is limited by the inner face of the upper portion of said ring like frame 33 and similarly the downward movement of the bowl is limited by the inner face of the lower portion of said ring like frame, as represented at 34 in Fig. 1. Unless a shock absorber or cushioning device be employed in connection with the tilting trap the latter contacts with the frame 33 with very considerable force, thus causing jar and noise. Attempts have been made to overcome this by providing dash pots or similar devices such, for example, as shown in the patent to Riedel, No. 56,096, July 3, 1866, but the same necessarily add very seriously to the cost of the appliance and are otherwise objectionable. Spring cushioning devices have also been employed, as shown, for example, in the patent to Purser, No. 883,825, April 7, 1908, but these are uncertain in action and otherwise objectionable. I have devised a very cheap yet thoroughly effective and readily applied shock absorber or cushioning device. In the preferred embodiment thereof, as shown in Figs. 1, 2 and 3, I bolt or otherwise secure a plate 35 to the frame and pass therethrough upright bolts 36 supporting at their upper end a plate 37 having upwardly projecting ears 38 between which is pivotally supported a vertical rod 39, herein shown as having an interiorly threaded upper end 40 receiving a rod 41 having threaded ends receiving nuts 42. Received for sliding movement upon the rod 41 is a collar 43 supported for rocking movement in a clamping member 44 by means of opposite screws 45 tapped through the clamping member 44 and engaging and supporting the collar 43. The end of the counterweighted lever 30' is, in Fig. 1, represented as received between the ends of the clamping member 44, the latter being looped to encircle the collar 43 while its opposite ends 46, 47 lie in parallelism with and receive between them the end of the lever 30'. Said ends of the member 44 act as clamping jaws and preferably a bolt or screw 48 is tapped through the adjacent ends of the lever 30 and member 44, so as to maintain them in position, but permitting a relative movement of said parts at the proper time. As shown most clearly in Fig. 3, the substantially parallel ends or jaws 46 and 47 of the member 44 receive between them the end of the lever 30' and the distance between the ends 46 and 47 at that point where the tip of the lever 30' plays between them is such as to bind said lever upon relative movement of said lever and said ends 46 and 47 upon said bolt 48. That is to say, in the form of friction shock absorber herein shown the parts act by rubbing contact or engagement with each other to absorb the shock of bowl movement. If desired, one of the ends, as, for example, the end 46, may be provided with a limiting lug 49 to prevent undue movement of the lever 30'.

The bowl 6 is held in its elevated position in Fig. 7 by the counterweighting lever 30', the bowl at such time being empty. When the bowl is filled and has started to descend, it thereby elevates the counterweighting end of the lever 30', and in so doing the said lever and clamping member 44 rise together without relative movement. The upper nut 42 is so positioned upon the rod 41 that before or substantially simultaneously with the engagement of the bowl 6 with the portion 34 of the ring like frame 33, the sliding collar 43 encounters said upper nut 42 and its movement is thereby arrested. The continued movement of the lever 30' results in the relative movement of said member and lever 30', thereby clamping or binding the tip of said lever between the ends 46 and 47 of said member, as already stated. This action occurs at such period of time as to cushion the bowl 6 and prevent all shock or jar when it contacts with the ring like frame 34 or even to prevent contact therewith if desired, dependent upon the exact position of the nut 42. Upon movement of the bowl 6 into the elevated position shown in Fig. 1, it is apparent that the collar 43 contacts with the lower nut 42 as shown and that by a similar relative movement of the lever 30' and clamping member 44, the bowl 6 is again cushioned.

My invention contemplates the utilization of friction means as a shock absorber as distinguished from a dash pot, a spring cushioning device or similar means. Preferably and as herein shown, the said friction means is operatively connected to or coöperates with the counterweighting lever 30', but it is apparent that within the scope of my invention the friction shock absorbing means, of any suitable character, may be rendered operative either by the counterweighting means or by the bowl itself or other suitable means carried or operated by the latter. Although I have herein represented the friction means as having movement with the counterweighting means and also movement relative thereto, it is apparent that said friction means may itself be normally stationary and be operated by movement of the bowl at the proper time.

Having thus described one illustrative embodiment of my invention, I desire it to be understood that although specific terms are employed, they are used in a generic and descriptive sense and not for purposes of limitation, the scope of the invention being set forth in the following claims:

1. A steam trap comprising a tilting chamber, counterweighting means therefor, and a wholly mechanical friction shock absorber coöperating with said means.

2. A steam trap comprising a tilting chamber, counterbalancing means therefor and a shock absorbing clamp operatively connected to said chamber and means intermittently to place said clamp in active and in inactive positions.

3. A steam trap comprising a tilting chamber, and a clamp bodily movable during the tilting movement of said chamber and having relatively movable parts acting as a shock absorber upon such relative movement and means intermittently to place said clamp in active and in inactive positions.

4. A steam trap comprising a tilting chamber, a counterbalancing lever therefor, and a shock-absorbing clamp operatively connected thereto, and means rendered operative by the tilting of the chamber for intermittently placing said clamp in clamping position.

5. A steam trap comprising a tilting chamber, a counterweighting lever, a clamping member connected to said lever, and means rendered operative by the tilting of the chamber to impart relative movement to said lever and member thereby to place the clamp in clamping position.

6. A steam trap comprising a tilting chamber, a counterweighting lever, a clamping member connected to said lever and movable bodily therewith, and means rendered operative by the movement of the counterweighting lever to terminate said bodily movement and thereby to move the clamp into clamping position.

7. A steam trap comprising a tilting chamber, counterweighting means therefor, a friction member connected to said means and movable therewith, and means to limit the movement of said member and thereby to move said friction member from a non-clamping to a clamping position.

8. A steam trap comprising a tilting chamber having friction means operatively connected thereto to arrest the movement of said trap and means periodically to place said friction means in trap-arresting position and periodically in non-trap arresting position.

9. A steam trap comprising a tilting chamber having counterweighting means friction means operatively connected to said counterweighting means to arrest the movement of said trap and means periodically to place said friction means in trap-arresting position and periodically in non-trap arresting position.

10. A steam trap comprising a tilting chamber having a friction shock absorber having a shock absorbing movement and a non-shock absorbing movement and operating means therefor operatively connected to said counterweighting means, said absorber and operating means being relatively movable thereby to effect said shock arbsorbing and non-shock absorbing movements.

11. A steam trap comprising a tilting chamber having a friction shock absorber and operating means therefor operatively connected to said counterweighting means, said absorber and operating means having a combined and also a relative movement whereby said absorber alternately occupies a shock absorbing and a non-shock absorbing position.

12. A steam trap comprising a tilting chamber, counterweighting means therefor and a friction shock absorber for and operatively connected to said counterweighting means and consisting of two parts having a rubbing contact in the shock absorbing action thereof said parts having a combined non-rubbing movement.

13. A steam trap comprising a tilting chamber, counterweighting means therefor, and a friction shock absorber operatively connected to said counterweighting means and consisting of a plurality of parts, and means causing them to bind upon each other periodically only during the tilting of said chamber.

14. A steam trap comprising a tilting chamber, counterweighting means therefor, and a shock absorber comprising mechanical parts and acting wholly through the frictional engagement of said mechanical parts and connected to said counterweighting means and operated thereby in the tilting of said chamber.

15. A steam trap comprising a tilting chamber, counterweighting means therefor, a shock absorber movable with and also relative to said counterweighting means and rendered operative by the movement of said counterweighting means, and means to vary the point in the tilting movement of the chamber, at which said shock absorber becomes active.

16. A steam trap comprising a tilting chamber, counterweighting means therefor, and a friction shock absorber movable with and also relative to said counterweighting means and rendered operative by movement of said tilting chamber in either direction.

17. A steam trap comprising a tilting chamber, counterweighting means therefor, and a friction shock absorber composed of mechanical parts and operatively connected to said counterweighting means and acting thereon through the frictional engagement of said mechanical parts to absorb the shock only at substantially the limit of movement of the chamber.

18. A steam trap comprising a tilting chamber, counterweighting means therefor, an arm having an abutment, a friction shock absorber movable upon said arm into engagement with said abutment, and pivotal connections between said friction shock absorber and said counterweighting means to render said shock absorber operative upon its engagement with said abutment.

19. A steam trap comprising a tilting chamber, a counterweighting lever connected thereto, an arm having spaced abutments, and a friction shock absorber movable upon said arm between and into contact with said abutments, said friction shock absorber being pivoted to said counterweighting lever and acting by rubbing engagement therewith to absorb the shock of movement of said chamber.

20. A steam trap comprising a tilting chamber, a counterweighting lever therefor, an arm having spaced abutments, a collar movable upon said arm between and into alternate engagement with said abutments, and binding connections between said collar and said lever operative upon engagement of said collar with either abutment.

21. A steam trap comprising a tilting chamber, a counterweighting lever therefor, an arm having spaced abutments, means movable along said arm between and into contact alternately with said abutments, and a friction clamp carried by said means and pivoted to said counterweighting lever and rendered operative to absorb the shock of movement of said trap upon engagement of said means with said abutments.

22. A steam trap comprising a tilting chamber, counterweighting means therefor, an arm having spaced abutments, a device movable on said arm between and into alternate engagement with said abutments, and binding connections between said device and said means, operative upon engagement of said device with either abutment.

23. A steam trap comprising a tilting chamber, counterweighting means therefor, an arm having spaced abutments, a device movable upon said arm between and into alternate engagement with said abutments, said device being pivoted to said counterweighting means and having binding engagement therewith upon binding engagement of said device with either abutment.

24. A steam trap comprising a tilting chamber, counterweighting means therefor, and a wholly mechanical shock absorber cooperating with said means.

In testimony whereof, I have signed my name to this specification, in the presence of two subscribing witnesses.

FRANK A. LITTLEFIELD.

Witnesses:
IRVING U. TOWNSEND,
ROBERT H. KAMMLER.

Copies of this patent may be obtained for five cents each, by addressing the "Commissioner of Patents, Washington, D. C."